(12) United States Patent
Chang et al.

(10) Patent No.: US 10,207,747 B2
(45) Date of Patent: Feb. 19, 2019

(54) REINFORCEMENT MEMBER

(71) Applicant: Hyundai Motor Company, Seoul (KR)

(72) Inventors: Hoon Chang, Seoul (KR); Dong Keun Yoo, Gyeongi-do (KR); Huen Sick Min, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 275 days.

(21) Appl. No.: 15/137,710

(22) Filed: Apr. 25, 2016

(65) Prior Publication Data

US 2017/0166260 A1 Jun. 15, 2017

(30) Foreign Application Priority Data

Dec. 10, 2015 (KR) .......................... 10-2015-0176386

(51) Int. Cl.
*B62D 29/00* (2006.01)
*B32B 3/28* (2006.01)
(Continued)

(52) U.S. Cl.
CPC ................ *B62D 29/00* (2013.01); *B32B 3/28* (2013.01); *B62D 25/00* (2013.01); *B62D 29/005* (2013.01);
(Continued)

(58) Field of Classification Search
CPC ...... B62D 29/00; B62D 29/005; B62D 29/04; B62D 29/043; B62D 29/046; B62D 25/00; B32B 3/12; B32B 3/18; B32B 3/28; B32B 3/30; B32B 27/04; B32B 27/08; B32B 2305/076; B32B 2307/546; B32B 2307/558; B32B 2605/00–2605/18;
(Continued)

(56) References Cited

U.S. PATENT DOCUMENTS 4,227,593 A * 10/1980 Bricmont ................ F16F 7/121
188/377
5,746,419 A * 5/1998 McFadden .............. B60R 19/18
188/377
(Continued)

FOREIGN PATENT DOCUMENTS

JP 2011-131791 A 7/2011
JP 2015-147473 A 8/2015
(Continued)

*Primary Examiner* — Scott R. Walshon
*Assistant Examiner* — Jasper Saberi
(74) *Attorney, Agent, or Firm* — Mintz Levin Cohn Ferris Glovsky and Popeo, P.C.; Peter F. Corless

(57) ABSTRACT

A reinforcement member is provided and includes a reinforcement unit that has a pair of reinforcement unit bodies. Each of the reinforcement unit bodies has a protruding surface protruding from a middle part of the reinforcement unit body relative to a longitudinal direction of the reinforcement unit body. The protruding surfaces of the reinforcement unit bodies are in contact with each other while opposing each other, and opposite end parts of the reinforcement unit have rectangular cross sections when cutting the reinforcement unit perpendicularly to a longitudinal direction of the reinforcement unit. A plurality of reinforcement units are arranged and the cross sections of the opposite end parts of the reinforcement units form columns and rows of the reinforcement member.

5 Claims, 4 Drawing Sheets

(51) Int. Cl.
    *B62D 25/00*    (2006.01)
    *F16F 7/12*         (2006.01)
    *B32B 3/30*         (2006.01)
    *B62D 25/04*        (2006.01)
(52) U.S. Cl.
    CPC ............... *B32B 3/30* (2013.01); *B62D 25/04* (2013.01); *F16F 7/122* (2013.01)
(58) Field of Classification Search
    CPC ............... B32B 2605/08; B60R 19/18; B60R 2019/1853; B60R 2019/1893; B60R 2019/186; B60R 2019/1866; B60R 2019/262; B60R 2019/264; F16F 7/121; F16F 7/122; F16F 7/124; E04C 2/30; E04C 2/32; E04C 2/322; E04C 2/326
    See application file for complete search history.

(56)            References Cited

U.S. PATENT DOCUMENTS

2014/0042758 A1*  2/2014  Buron .................. B60R 19/03
                                                      293/133
2014/0049031 A1*  2/2014  Werum ................ B62D 21/152
                                                      280/784

FOREIGN PATENT DOCUMENTS

| KR | 10-1998-0031341 A | 7/1998 |
| KR | 20-0183512 Y1 | 6/2000 |
| KR | 2004-0106813 A | 12/2004 |
| KR | 20-0416879 Y1 | 5/2006 |
| WO | 2014/113544 A1 | 7/2014 |

\* cited by examiner

REINFORCEMENT MEMBER

CROSS REFERENCE TO RELATED APPLICATION

The present application claims priority to Korean Patent Application No. 10-2015-0176386, filed Dec. 10, 2015, the entire contents of which is incorporated herein for all purposes by this reference.

BACKGROUND

Field of the Invention

The present invention relates to a reinforcement member, having a high resistance to bending or compression by using fiber-reinforced materials.

Description of the Related Art

Generally, a reinforcement member is disposed in an area where a vehicle body requires reinforcement, thereby improving mechanical properties of the vehicle body. In recent years, a reinforcement member including of fiber-reinforced materials such as carbon fibers has been used to achieve weight reduction of a vehicle. The reinforcement member is generally disposed in a center pillar of the vehicle body. When manufactured, a conventional integrally formed reinforcement member requires to be modified to respond to the various types, structures, shapes, sizes, and desired performances of vehicles. Accordingly, it is required that a metallic mold that corresponds to the conventional reinforcement member be developed, thus requiring extensive cost and time to develop the metallic mold suitable for various situations.

The foregoing is intended merely to aid in the understanding of the background of the present invention, and is not intended to mean that the present invention falls within the purview of the related art that is already known to those skilled in the art.

SUMMARY

Accordingly, the present invention provides a reinforcement member having a high resistance to bending or compression by using fiber-reinforced materials, and includes reinforcement units manufactured using a simplified process.

According to one aspect of the present invention, a reinforcement member may include: a reinforcement unit body having a protruding surface that protrudes or extends from a middle part of the reinforcement unit body relative to a longitudinal direction of the reinforcement unit body; and a reinforcement unit including a pair of reinforcement unit bodies, wherein the pair of reinforcement unit bodies may be connected to each other to cause the protruding surfaces of the reinforcement unit bodies to be in contact with each other (e.g., abut) while opposing each other, and opposite end parts of the reinforcement unit may have rectangular cross sections when cutting the reinforcement unit perpendicularly to a longitudinal direction of the reinforcement unit, wherein a plurality of reinforcement units may be arranged in a manner in which the cross sections of the opposite end parts of the reinforcement units form columns and rows of the reinforcement member.

Each of the reinforcement unit bodies may include: a middle plate having the protruding surface that protrudes from a middle part of the middle plate relative to a longitudinal direction of the middle plate, and having connecting surfaces formed on opposite ends of the protruding surface, the connecting surfaces of the middle plate being in contact with connecting surfaces of a neighboring reinforcement unit that forms a column of the reinforcement member; and a pair of attachment plates connected to opposite sides of the middle plate respectively and thus, in the reinforcement unit, the attachment plates of the reinforcement unit bodies may form the rectangular cross sections at the opposite end parts of the reinforcement unit in cooperation with the connecting surfaces of the middle plates.

The attachment plates of the reinforcement unit body may be in contact with attachment plates of neighboring reinforcement units that form the rows of the reinforcement member. The middle plate may be continuously bent in alternate directions to form the protruding surface in a first direction, and form the connecting surfaces in a second direction. A protruding length of the middle plate may be about the same as a width of each of the attachment plates. The middle plate may include flanges disposed on opposite sides thereof to connect the flanges to the pair of attachment plates while being in surface contact with the pair of attachment plates. The middle plate and the attachment plates may include fiber-reinforced materials.

According to the present invention as mentioned above, the reinforcement member may be manufactured by a simplified process using a semi-finished product such as a fiber-reinforced preform or a prepreg that forms a continuous pattern, or by injection molding. Since the reinforcement member of the present invention may have a rectangular shape different from a hexagonal shape of an existing honeycomb structure, the reinforcement member may have the same high resistance to bending or compression that the existing honeycomb structure but with a simplified manufacturing process than the existing honeycomb structure, which improves productivity.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
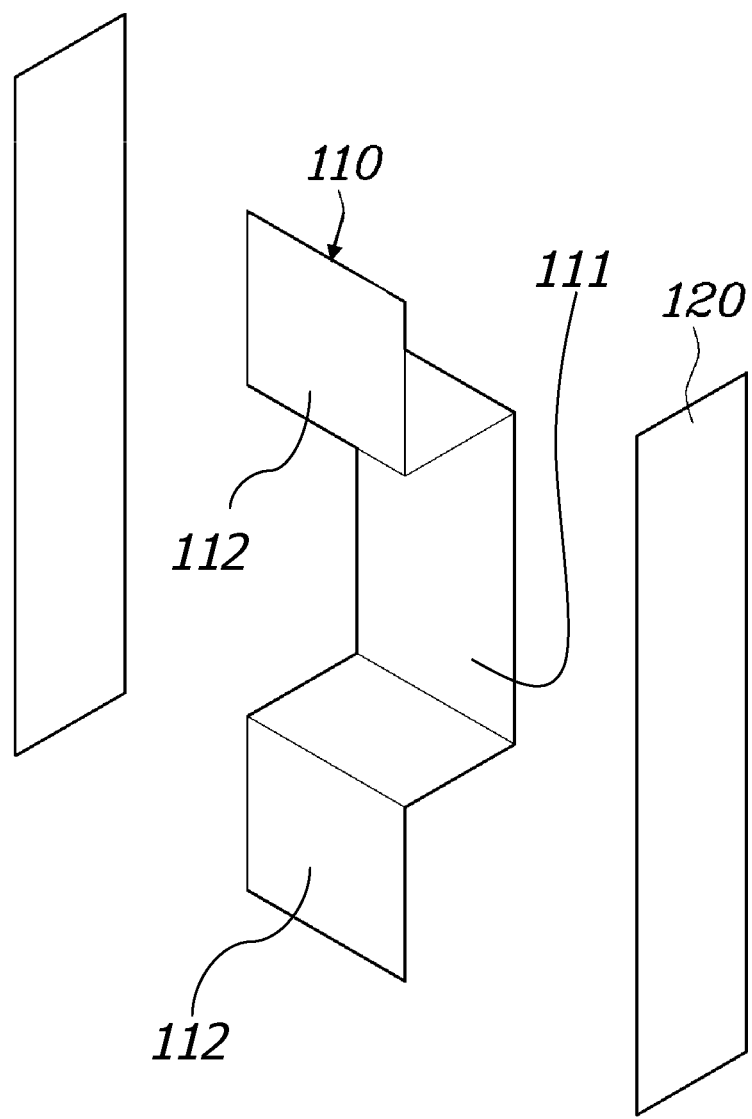
FIG. 1 is a view showing a middle plate and attachment plates according to an exemplary embodiment of the present invention.
Figure 2:
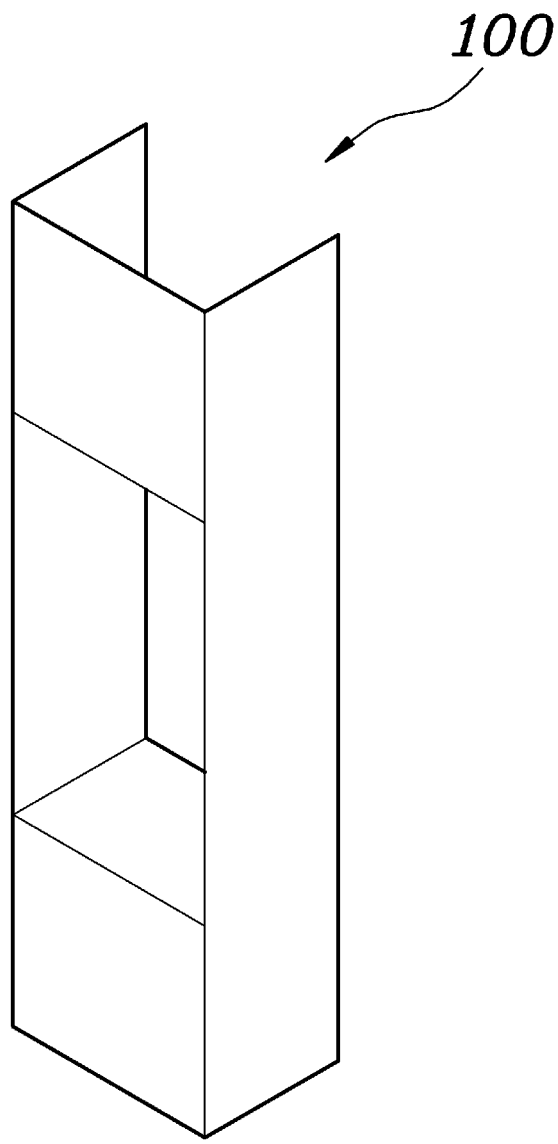
FIG. 2 is a view showing a reinforcement unit body according to the exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, an exemplary embodiment of the present invention will be described in detail with reference to the accompanying drawings. Throughout the drawings, the same reference numerals will refer to the same or like parts.

A reinforcement member of the present invention may include: a reinforcement unit 200 having a pair of reinforcement unit bodies 100, wherein each of the reinforcement unit bodies 100 may have a protruding surface that protrudes from a middle part of the reinforcement unit body 100 relative to a longitudinal direction of the reinforcement unit body, and the pair of reinforcement unit bodies 100 may be connected to each other in which the protruding surfaces of the reinforcement unit bodies 100 may be in contact with each other (e.g. may be abutting) while opposing each other, and opposite end parts of the reinforcement unit 200 may have rectangular cross sections 210 when cutting the reinforcement unit perpendicularly to a longitudinal direction of the reinforcement unit 200. Additionally, a plurality of reinforcement units 200 may be arranged in which the cross sections 210 of the opposite end parts of the reinforcement units 200 may form columns and rows of the reinforcement member.

Generally, the reinforcement member may be disposed in an area where a vehicle body requires reinforcement, thereby improving mechanical properties of the vehicle body. In recent years, a reinforcement member including fiber-reinforced materials such as carbon fibers has been used to achieve weight reduction of a vehicle. The reinforcement member may be disposed in a center pillar of the vehicle body. When manufactured, an integrally formed conventional reinforcement member requires to be modified to be capable of corresponding to the various types, structures, shapes, sizes, and desired performances of vehicles. Accordingly, a metallic mold may be required to be developed that corresponds to the conventional reinforcement member, thus extensively increasing associated cost and time to develop the metallic mold suitable for the adaptability of the conventional reinforcement member.

First, the reinforcement unit body 100 may include the protruding surface 111 formed by protruding from the middle part of the reinforcement unit body 100 relative to the longitudinal direction of the reinforcement unit body 100. The protruding surface 111 may be formed by protruding from the middle part of the reinforcement unit body 100 to thus combine the pair of the reinforcement unit bodies 100 with each other in such a manner that the protruding surfaces 111 are in contact with each other (e.g., abut). Accordingly, the pair of the reinforcement unit bodies 100 may be stably combined with each other by the protruding surfaces 111 being in contact with each other. The pair of the reinforcement unit bodies 100 may be proportional to each other relative to the protruding surfaces 111.

Further, each of the reinforcement unit bodies 100 may include: a middle plate 110 having the protruding surface 111 that protrudes from a middle part of the middle plate 110 relative to a longitudinal direction of the middle plate, and having connecting surfaces 112 formed on opposite ends of the protruding surface 111. The connecting surfaces of the middle plate 110 may be in contact with or abut connecting surfaces of a neighboring reinforcement unit 200 that forms a column of the reinforcement member. Additionally, each of the reinforcement unit bodies 100 may include a pair of attachment plates 120 connected to opposite sides of the middle plate 110 respectively and thus, in the reinforcement unit 200, the attachment plates of the reinforcement unit bodies may form the rectangular cross sections at the opposite end parts of the reinforcement unit 200 in cooperation with the connecting surfaces of the middle plates.

The middle plate 110 and the attachment plates 120 may have plate shapes, and the middle part of the middle plate 110 may be bent to protrude from the middle plate 110. Accordingly, the reinforcement member may be manufactured in a simplified process using a semi-finished product such as a fiber-reinforced preform or a prepreg that forms a continuous pattern, or by injection molding. As shown in FIG. 1, the middle plate 110 may include the protruding surface 111 that protrudes from the middle part of the middle plate 110. In particular, first, the middle plate may be bent at about a right angle in a first direction; second, the middle plate may be bent at about the right angle in a second direction; third, the middle plate may then be bent at about the right angle again at the first direction; and fourth, the middle plate may be bent at about the right angle again at the second direction.

As mentioned above, the middle plate 110 may be manufactured to continuously bend in alternate directions to form the protruding surface 111 in the first direction, and form the connecting surfaces 112 in the second direction. Further, the pair of attachment plates 120 may be connected to the opposite sides of the middle plate 110 in a perpendicular direction to the protruding surface 111. As shown in FIG. 1, each of the attachment plates 120 may have a rectangular plate shape to simplify a manufacturing process thereof. A length of the attachment plate 120 may be about the same as a length of the middle plate 110, and a width of the attachment plate 120 may be about the same as a protruding length of the middle plate 110. Accordingly, the pair of attachment plates 120 may cover the opposite sides of the middle plate 110.

Figure 3:
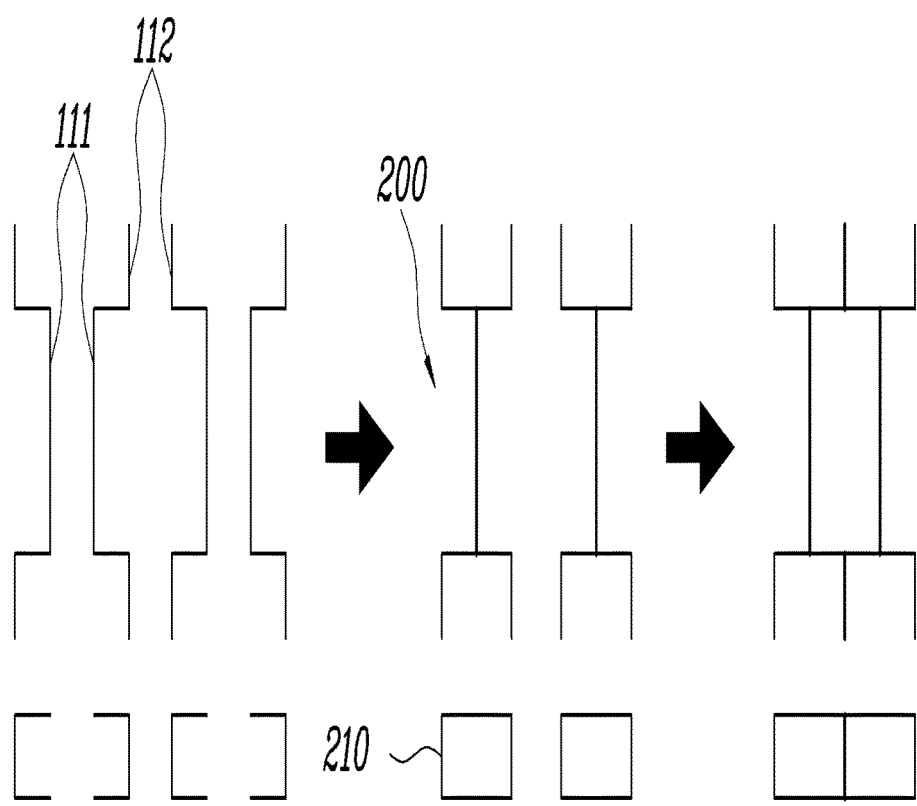
FIG. 3 is a view showing combination of reinforcement units according to the exemplary embodiment of the present invention.

Since the attachment plates 120 may be perpendicularly in contact with the middle plate 110, the connection therebetween may be unstable. The attachment plates 120 and the middle plate 110 may be more stably connected to each other by the addition of perpendicularly folded flanges formed disposed along the opposite sides of the middle plate 110 in which the flanges may be connected to the pair of attachment plates 120 while being in contact with the pair of attachment plates 120. The protruding surfaces of the pair of the reinforcement unit bodies 100 having the above-mentioned configuration may be in contact with each other, and thus the reinforcement unit 200 may be formed. As shown in FIG. 3, the opposite end parts of the reinforcement unit 200 may have the rectangular cross sections 210 when cutting the reinforcement unit perpendicularly to a longitudinal direction of the reinforcement unit.

Furthermore, since the reinforcement member of the present invention may be formed in a rectangular shape different from a hexagonal shape of an existing honeycomb structure, the reinforcement member may have the same high resistance to bending or compression as the existing honeycomb structure, but may be manufactured using a more simplified manufacturing process compared to the existing honeycomb structure, thus improving productivity. Additionally, a plurality of the reinforcement units 200 and the reinforcement unit 200 including the pair of the reinforcement unit bodies 100 may be combined with each other. Particularly, the reinforcement units 200 may have cross sections 210 of the opposite end parts thereof that form the columns and rows of the reinforcement member.

Figure 4:
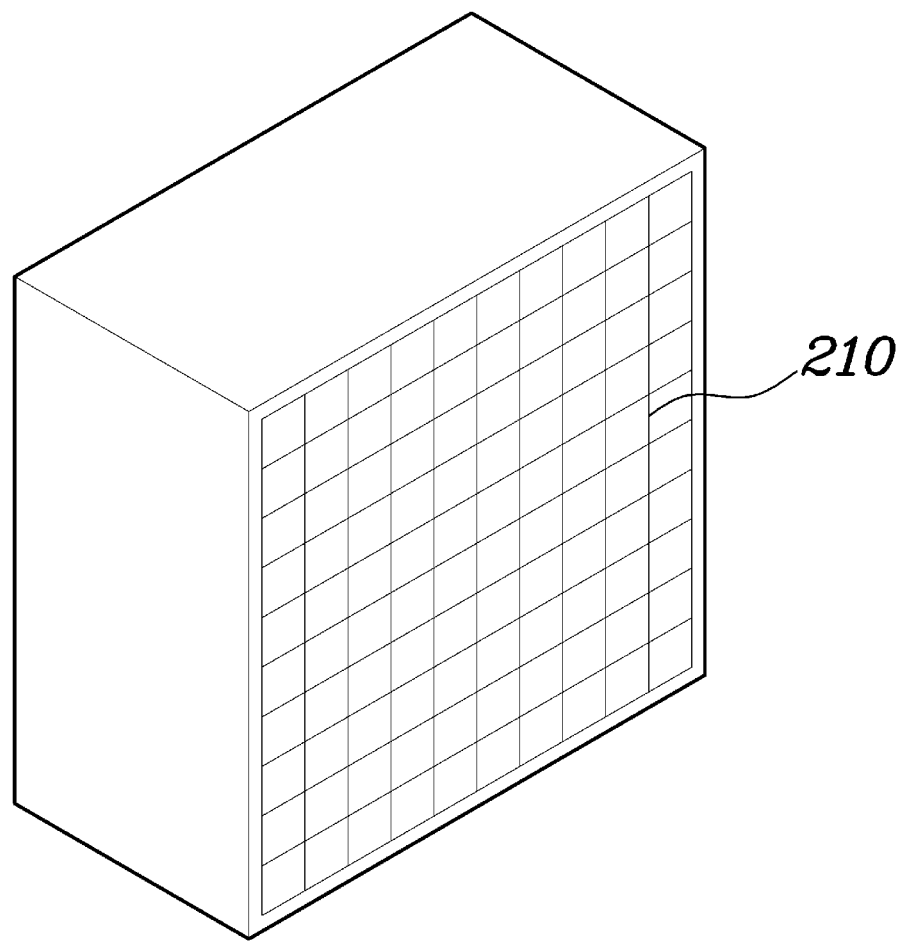
FIG. 4 is a view showing a reinforcement member including a plurality of the reinforcement units according to the exemplary embodiment of the present invention.

As shown in FIG. 4, since the reinforcement units 200 may be disposed side by side (e.g., proximate to each other), the cross sections 210 of the opposite end parts of the reinforcement units 200 may form the columns and rows of the reinforcement member. Meanwhile, a pair of the connecting surfaces 112 may be formed on the opposite sides of the middle plate 110 in a direction opposite to a direction in which the protruding surface 111 is formed. The connecting surfaces 112 may abut the connecting surfaces of the neighboring reinforcement unit 200 that form the column of the reinforcement member. In other words, the reinforcement unit 200 and the neighboring reinforcement unit 200 may be connected to each other and the connecting surfaces 112 of the neighboring reinforcement unit 200 may accordingly come into contact with the connecting surfaces 112 of the opposite end parts of the reinforcement unit 200.

The elements of the reinforcement member of the present invention may be connected to each other using an adhesive, and further may be connected to each other using rivets, tape, or other fastening methods. For example, first, the elements may be connected to each other using the adhesive or the tape, and then rivets may be used to achieve a more stable connection. In addition, the attachment plates 120 connected to the opposite sides of the middle plate 110 of the reinforcement unit 200 may abut the attachment plates of neighboring reinforcement units 200 that form the rows of the reinforcement member. In other words, the reinforcement unit 200 and the neighboring reinforcement units 200 may be connected to each other and accordingly, the attachment plates of the neighboring reinforcement units 200 may come into contact with the attachment plates 120 disposed on an upper part of the reinforcement unit 200 and on a lower part thereof.

Moreover, the middle plates 110 of the reinforcement unit 200 and the neighboring reinforcement units 200 may have the opposite end parts of the middle plates 110 connected to each other except for middle parts of the middle plates 110. Additionally, the attachment plates 120 of the reinforcement unit 200 and the neighboring reinforcement units 200 may have entire surfaces of the attachment plates 120 in contact with each other thus creating a more stable connection between the reinforcement unit 200 and the neighboring reinforcement units 200. In the connection of the connecting surfaces 112, the elements of the reinforcement member of the present invention may be connected to each other using an adhesive, and further may be connected to each other using rivets or tape. For example, first, the elements may be connected to each other using the adhesive or the tape, and then rivets may be used to achieve a more stable connection.

As mentioned above, the reinforcement units 200 may be disposed at a location suitable for an area where a vehicle body requires reinforcement. In other words, the reinforcement member may be manufactured according to the type, structure, shape, size, and desired performance of a vehicle. Accordingly, the present invention eliminates the need to manufacture the metallic molds as taught by conventional reinforcement members. Furthermore, compared to the conventional reinforcement member, the reinforcement member of the present invention allows a vehicle body to be more efficiently reinforced since the reinforcement unit 200 may be manufactured using a simplified process.

Since the opposite end parts of the reinforcement units 200 may have the rectangular cross sections 210, the reinforcement units 200 may be more stably combined with each other. Additionally, though an external force may be applied to the reinforcement unit 200 in a direction parallel to the longitudinal direction of the reinforcement unit, the external force may be transmitted along the protruding surface 111 of the middle plate 110, and then may be diverted to the connecting surfaces 112 of the opposite end parts of the reinforcement unit 200, providing the reinforcement member with high resistance to bending or compression. As mentioned above, since the middle plate 110 and the attachment plates 120 include fiber-reinforced materials such as carbon fibers, the reinforcement member of the present invention may realize highly improved mechanical properties and the weight reduction of a vehicle, and thus fuel efficiency of the vehicle may be improved.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A reinforcement member, comprising:
a reinforcement unit body having a protruding surface that protrudes from a middle part of the reinforcement unit body relative to a longitudinal direction of the reinforcement unit body; and
a reinforcement unit including a pair of reinforcement unit bodies, wherein the pair of reinforcement unit bodies are connected to each other to cause the protruding surfaces of the reinforcement unit bodies to be in contact with each other while opposing each other, and opposite end parts of the reinforcement unit have rectangular cross sections when cutting the reinforcement unit perpendicularly to a longitudinal direction of the reinforcement unit,
wherein a plurality of reinforcement units are provided with cross sections of the opposite end parts of the reinforcement units forming columns and rows of the reinforcement member,
wherein each of the reinforcement unit bodies includes:
a middle plate provided with the protruding surface that protrudes from a middle part of the middle plate relative to a longitudinal direction of the middle plate, and provided with connecting surfaces integrally formed on opposite ends of the protruding surface, respectively, the connecting surfaces of the middle plate being in contact with connecting surfaces of a neighboring reinforcement unit that forms a column of the reinforcement member; and
a pair of attachment plates connected to opposite sides of the middle plate respectively and, in the reinforcement unit, the attachment plates of the reinforcement unit bodies form the rectangular cross sections at the opposite end parts of the reinforcement unit in cooperation with the connecting surfaces of the middle plates, and wherein the connecting surfaces of the middle plate are bent in opposite directions from each other, and disposed in parallel with the protruding surface.

2. The reinforcement member of claim 1, wherein the attachment plates of the reinforcement unit body are in contact with attachment plates of neighboring reinforcement units that form the rows of the reinforcement member.

3. The reinforcement member of claim 1, wherein a protruding length of the middle plate is about the same as a width of each of the attachment plates.

4. The reinforcement member of claim 1, wherein the middle plate includes flanges disposed on opposite sides thereof and the flanges are connected to the pair of attachment plates while being in surface contact with the pair of attachment plates.

5. The reinforcement member of claim 1, wherein the middle plate and the attachment plates include fiber-reinforced materials.

\* \* \* \* \*